Patented May 12, 1942

2,282,343

UNITED STATES PATENT OFFICE 2,282,343

LUBRICATING COMPOSITION

Carl F. Prutton, Cleveland Heights, Ohio, assignor, by mesne assignments, to The Lubri-Zol Development Corporation, Cleveland, Ohio, a corporation of Delaware No Drawing. Application March 1, 1939,
Serial No. 259,230

16 Claims. (Cl. 252—54)

This application is a continuation in part of my copending applications Serials Nos. 737,070, filed July 26, 1934; 755,987, filed December 4, 1934, and 96,537, filed August 17, 1936, now Patent No. 2,150,079.

This invention relates, as indicated, to lubricating compositions, and more particularly to compositions for use in connection with the lubrication of the working parts of internal combustion engines, motor vehicles, etc., and it is among the objects of this invention to provide compositions obviating the disadvantages of the usual petroleum oils.

When in use, as in the crankcase of an automobile, for example, it is a well-known fact that oils deteriorate, forming considerable quantities of gummy and semi-solid materials. These materials may deposit on the metal parts with which the lubricant comes in contact in the form of gummy, resinous, or varnish-like deposits, or they may remain, to some extent, suspended in the body of the lubricant and act as the basis for the accumulation of dirt, metallic particles, and other foreign matter to form "sludge."

These deposits thicken the oil, increase friction, lower the general efficiency of the engine, and make necessary more frequent drainage and replacement of the lubricant. In aggravated form, they may even cause failure of an engine due to sticking of the pistons in the cylinders, or bearing failures resulting from plugged oil passages and the like.

In winter, the passage of small amounts of gasoline into the crank case of an engine often results in the precipitation of "sludge" materials which are particularly objectionable since they hinder lubrication of the engine on starting, causing undue wear and starting trouble. Obviously, an oil which does not sludge, under such conditions, would be especially desirable for winter use. The frequent oil changes necessary at all times of the year in order to keep an engine operating efficiently and without danger of injury are a major source of expense and annoyance.

In the case of gear lubrication, particularly when the lubricant is exposed to elevated temperatures, there is a tendency to form similar deposits. Such deposits cause similar difficulties, and particularly in the case of heavily loaded gears, cause damage to the gear teeth surfaces since the deposit is likely to cause mis-alignment when precipitated on the gear surfaces, or bearing failures when precipitated in the oil passages.

It has been discovered that the "sludge" and other deposits which form in the lubricating oil on use contain two predominant components comprising (1) polymerized hydrocarbons and (2) more or less oxidized polymerized hydrocarbons. These components act as cementing agents for small particles of inorganic and insoluble materials, greatly impairing the lubricating effect of the oil. I have found that the best solvents for one component of these deposits are not the best for the other. For addition to a lubricating oil it is obvious that solvents must be found which are mutually compatible, soluble or miscible in the oil, and which will dissolve the two components of the deposits previously referred to. By lubricating oils are meant mineral oils or their synthetic equivalents.

It is, therefore, among the objects of this invention to provide a lubricant which will not readily lose its lubricating qualities and suffer other deterioration due to "sludge" formation.

Another object of this invention is to provide a lubricating composition which will not readily lose its lubricating qualities due to "sludge" formation and will also have extreme pressure characteristics.

It is also among the objects of this invention to provide a lubricating mineral oil which will resist deterioration due to sludge formation and which will be especially effective under conditions of extreme pressure.

Other objects of the invention will appear as the description proceeds.

To the accomplishment of the foregoing and related ends, said invention, then, consists of the means hereinafter fully described and particularly pointed out in the claims.

The following description sets forth in detail certain approved combinations of ingredients embodying my invention, such disclosed means constituting, however, but certain of various forms in which the principle of the invention may be used.

Broadly stated, this invention comprises incorporating at least one each of a halogenated oxygen-free organic compound and an oxygen-bearing organic compound, which for most purposes is also preferably halogenated, with an oil base.

As is hereinafter more particularly pointed out, the above-defined components of the lubricant comprising this invention will preferably and for best results have certain physical and chemical characteristics which especially adapt the same for use in conjunction with the principal types of engines in use today, and for other uses.

The solvent components of the lubricant should be of fairly low volatility, i. e., with a vapor pressure at a temperature of 140° C. of below atmospheric, or preferably a vapor pressure less than atmospheric at a temperature of 170° C. In one embodiment of my invention now in commercial use, one component of my new solvent has a vapor pressure less than atmospheric at a temperature above 300° C. A mixture of two components, one with a vapor pressure a little below atmospheric at 170° C. and the other with a vapor pressure a little below atmospheric at 350° C., has proven highly satisfactory.

*Oxygen-free component*

I have found that of the entire class of halogenated oxygen-free organic compounds usable as a component of the solvent constituent in my new lubricant, as above defined, the halogenated hydrocarbons and generally those of the aromatic series are to be preferred for most purposes as solvents for the unoxidized polymerized hydrocarbon deposit. Throughout this application, the term "aromatic series" is intended to include homologs as well. As hereinafter pointed out, however, certain of the aliphatic compounds of this type are particularly useful for certain purposes.

In the case of the halogenated aromatic oxygen-free compounds, it is generally preferable that the halogen be attached to a carbon atom of the benzenoid ring. These latter compounds are usually more desirable because of their non-corrosive character and general stability.

The halogenated oxygen-free organic compounds, as noted, may be either:

A. Aliphatic, such as halogenated:

I. Hydrocarbons,

Notably, those chlorinated or fluorinated hydrocarbons which contain from four to ten or more carbon atoms, e. g.
    Fluorinated hexane
    Fluorinated octane
    Fluorinated decane II. Amines Primary, secondary and tertiary, e. g. chlorinated or fluorinated, hexylamines, diamylamines, tri-amylamines, such as:
    Fluorinated tri-amyl amines
    Fluorinated tributyl amines
    Fluorinated hexyl amines III. Nitriles, e. g.

Chlorinated or fluorinated:
    Ethyl cyanide
    Butyl cyanide
    Octyl cyanide
    Lauryl nitrile
    Stearyl nitrile IV. Sulphides, e. g.

Chlorinated or fluorinated:
    Di-ethyl sulphide
    Di-butyl sulphide
    Di-octyl sulphide
    Di-amyl sulphide
    Di-lauryl sulphide
    Di-cetyl sulphide V. Mercaptans, e. g.

Chlorinated or fluorinated:
    Lauryl mercaptan
    Cetyl mercaptan
    Carnaubyl mercaptan
    Ceryl mercaptan
    Montanyl mercaptan
    Melissyl mercaptan
    Myricyl mercaptan VI. Thiocyanates (rhodanates) e. g.

Chlorinated or fluorinated:
    Ethyl thiocyanate
    Butyl thiocyanate
    Lauryl thiocyanate
    Cetyl thiocyanate
    Ceryl thiocyanate or the more generally preferable:

B. Cyclic compounds, such as halogenated:

I. Benzene and related compounds such as:

(1) Halogenated benzene, e. g.
      (a) Chlorinated benzene, e. g.
        The dichlorbenzenes, notably the ortho compound
      (b) Brominated benzene, e. g.
        Ortho-dibrom benzene
      (c) Fluorinated benzene (2) Halogenated derivatives of benzene such as:
      (a) Halogenated homologs of benzene, e. g.
      Mono-chlor toluene
      Mono-chlor xylene
      Mono-chlor cymene
      Ethyl mono-chlor benzenes
      Propyl mono-chlor benzenes
      Di-ethyl dichlor benzenes
      Propyl dichlor benzenes
      Di-ethyl tetrachlor benzenes
      (b) Halogenated amino derivatives of benzene, e. g.
      Chlorinated aniline
      Mono-chlor aniline (preferably the ortho-compound)
      Mono-chlor dimethyl aniline
      Chlorinated toluidines
      Chlorinated xylidines
      Chlorinated diphenylamine
      (c) Halogenated hydrobenzenes, e. g.
      Hydrogenated dichlor-benzenes
      Dichlorhexahydrobenzene (dichlor cyclohexane)

II. Polyphenyls, and related compounds, including diphenyl, diphenyl benzenes, etc., such as
   (1) Halogenated diphenyl, e. g.
      (a) Chlorinated diphenyl, e. g.
         Mono-chlor diphenyls
         Di-chlor diphenyls
         Tri-chlor diphenyls
      (b) Brominated diphenyl, e. g.
         The mono-brom diphenyls
      (c) Fluorinated diphenyl
   (2) Halogenated derivatives of diphenyl, such as,
      (a) Halogenated homologs of diphenyl, e. g.
         Chlorinated phenyl toluenes
         Ethylated, or propylated, chlorinated diphenyl, e. g. di-ethyl tetrachlor diphenyl
      (b) Halogenated amino derivatives of diphenyl, e. g.
         Chlorinated phenyl-anilines
         Chlorinated phenyl-toluidines
         Chlorinated diphenyl amines (xenyl amines)
      (c) Halogenated hydrodiphenyls, e. g.
         Chlorinated phenyl hexahydrobenzene
         Chlorinated dodecahydrodiphenyl
III. Naphthalene and related compounds, such as
   (1) Halogenated naphthalene
      (a) Chlorinated naphthalene, e. g.
         α-mono-chlor naphthalene
      (b) Brominated naphthalenes, e. g.
         α-mono-brom naphthalene
      (c) Fluorinated naphthalene
   (2) Halogenated derivatives of naphthalenes, such as:
      (a) Halogenated homologs of naphthalenes, e. g.
         Chlorinated methyl naphthalenes, such as α-methyl naphthalene
         Chlorinated ethyl, propyl, or isopropyl naphthalenes
      (b) Halogenated amino derivatives of naphthalene, e. g.
         Chlorinated naphthylamines
         Mono-chlor naphthyl amine
      (c) Halogenated hydronaphthalenes, e. g.
         Chlorinated decahydronaphthalene
         Chlorinated tetrahydronaphthalene
IV. Phenanthrene and anthracene and related compounds, such as:
   (1) Chlorinated phenanthrene, chlorinated anthracene
   (2) Halogenated derivatives of phenanthrene and anthracene, such as:
      (a) Halogenated homologs, e. g.
         Chlorinated 1-methyl phenanthrene
         Chlorinated 3-methyl phenanthrene
         Chlorinated 9,10 dimethyl phenanthrene
         Chlorinated propyl and isopropyl derivatives of phenanthrene such as retene
         Chlorinated dimethyl anthracenes
         Chlorinated α-methyl anthracene
         Chlorinated β-methyl anthracene
         Chlorinated propyl and isopropyl derivatives of anthracene (b) Halogenated amino derivatives, e. g.
         Chlorinated phenanthrylamines
         Chlorinated anthramines
      (c) Halogenated hydrophenanthrenes halogenated hydroanthracenes, e. g.
         Chlorinated retene oil (contains hydro retene)
V. Chrysene, picene, and related compounds, including their derivatives, such as homologs, amino derivatives and other substitution products.
VI. Bridged ring compounds, such as the terpenes and related compounds, and their derivatives, e. g. chlorinated pinene.
VII. Heterocyclic compounds, such as pyridine, quinoline, pyrrole, thiophene, and derivatives of them, e. g. mono-chlor pyridine.
VIII. Nitriles derived from any of the above compounds, e. g.
   Chlorinated:
      Benzonitrile
      Tolunitriles
      Benzyl cyanide
      Naphthyl cyanide
      Xenyl cyanide
      Cyclohexyl cyanide
IX. Sulphides derived from any one of the above compounds, e. g.
   Chlorinated:
      Diphenyl sulphide
      Dibenzyl sulphide
      Dixylyl sulphides
      Di-naphthyl sulphides
      Dixenyl sulphides
      Dicyclohexyl sulphide.
X. Mercaptans derived from any of the above compounds, e. g.
   Chlorinated:
      Benzyl mercaptan
      Phenyl benzyl mercaptans
      Naphthyl mercaptans
      Phenyl propyl mercaptans
      Cyclohexyl mercaptan
XI. Thiocyanates, e. g.
   Chlorinated:
      Benzyl thiocyanate
      Phenyl ethyl thiocyanate
      Phenyl propyl thiocyanate
      Cyclohexyl thiacyanate It will be noted that the above enumerated examples of the organic ring compounds which are usually preferred are, in general, compounds of the aryl type, i. e., compounds containing benzenoid ring structures and also of the type in which the halogen is directly attached to an atom which is a part of such ring structure. Very satisfactory results may be obtained when two or more different halogens are present in the same molecule, ortho brom chlor benzene being a good example of such a compound. If the aromatic compounds have been alkylated, they are often especially effective.

As a matter of convenience, the halogenated diphenyls and substituted diphenyls, as well as halogenated substituted benzenes where two or more phenyl groups are directly linked, may be inclusively referred to as halogenated polyphenyls.

Some of the best examples of the aromatic solvents are:

>  Ortho-dichlor benzene
>  Mono-chlor toluene
>  Di-ethyl dichlor benzenes
>  Di-ethyl tetrachlor benzenes
>  Chlorinated diphenyl
>  Chlorinated alkylated diphenyl Good examples of halogenated aliphatic hydrocarbons are:

Fluorinated pentane
Fluorinated hexane
Fluorinated octane
Halogenated petroleum derivatives, particularly halogenated petroleum waxes.

*Oxygen-bearing component*

I have found that of the entire class of oxygen-bearing organic compounds usable as a component in my improved solvent, as above defined, the halogenated compounds and preferably those of the aromatic series, are generally superior solvents for the oxidized polymerized hydrocarbon deposit, and that these solvents may be used in conjunction with the solvents for the unoxidized polymerized hydrocarbon deposit, also being compatible with the oil. Here again, compounds of the aromatic series with the halogen attached to the ring are favored. However, a certain number of the oxygen-bearing aliphatic compounds have been found to be very effective.

The oxygen-bearing components may, for convenience, be classified as follows:

I. ALIPHATIC, OR CARBON CHAIN TYPE

> Oxygen-bearing derivatives of:
> A. Hydrocarbons of the paraffin series;
> B. Hydrocarbons of the olefine series; and
> C. Hydrocarbons of the acetylene series.

II. ORGANIC RING TYPE

> Oxygen-bearing derivatives of:
> A. "Carbon Ring" Type Compounds
> (1) Of the aromatic, or allied type, including oxygen-bearing derivatives of benzene, naphthalene, anthracene, etc., also compounds of the bridged ring type, such as the terpenes, and related compounds.
> (2) Of the class including the cyclo-paraffins, cyclo-olefines, etc. Examples of this class are oxygen-bearing derivatives of the following:
>> (a) Hydrogenation products of benzene (e. g. cyclohexane, cyclohexene, cyclohexadiene), such as hydrogenated phenol, notably
>>> Cyclohexanol
>>> Di-hydro phenol
>>> Tetra-hydro phenol
>> (b) Hydrogenation products of naphthalene (e. g., decahydronaphthalene, tetrahydronaphthalene, etc.), such as the hydrogenated naphthols.
>> (c) Naphthenes, such as naphthenic acid, etc.
> (3) Of mixed type such as derivatives of indene, hydrindene, hydranthracene, etc.

> B. "Heterocyclic" Type Compounds
> (1) Of the aromatic or allied type including derivatives of pyridine, quinoline, etc.
> (2) Other types such as furane and its derivatives and derivatives of thiophene, pyrrole, etc.

The oxygen-bearing derivatives of the foregoing compounds may also be classified according to the nature of the attachment of the oxygen to the molecule, viz.:

> I'. Directly attached to one or more carbon atoms, as in the case of:
> (1') Ethers and analogous compounds
> (2') Compounds containing the

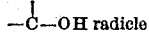

> such as alcohols and other derivatives of carbinol (including phenols, cresols, naphthols, etc.)
> (3') Compounds containing the carbonyl

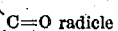

> such as aldehydes, ketones, organic acids, esters and salts of organic acids, thio-acids and esters of thio-acids
> (4') Compounds in which oxygen forms a part of a ring structure, e. g. compounds containing the furyl or hydrofuryl groups.
> (5') Compounds with an inorganic radicle where the oxygen is directly attached to a carbon atom, e. g.
>> Arsenites
>> Hypochlorites
>> Phosphites
>> Thiophosphates
>> Thiophosphites
>> β-hydroxylamines
>> Borates > II'. Indirectly attached through the means of some other atom, i. e., in the form of an inorganic radicle, e. g.
>> Arsenate
>> Chlorate
>> Chlorite
>> Cyanate
>> α-hydroxylamine
>> Nitrate
>> Nitrite
>> Nitro
>> Nitroso
>> Oxime
>> Perchlorate
>> Phosphate
>> Sulphate
>> Sulphite
>> Sulphinic acid
>> Sulphone
>> Sulphonic acid
>> Sulphoxide
>> Thiophosphate
>> Thiophosphite
>> Thio-sulphate (Note:—This class includes salts of organic bases with inorganic oxy-acids.)

The following table indicates some of the compounds which are especially suitable, halogenated or unhalogenated, as the case may be:

Organic oxygen compounds

| Ring compounds | Unhalogenated | Halogenated |
|---|---|---|
| Aromatic phenols | Phenol<br>α-Naphthol<br>Amino phenol<br>Butyl phenol<br>Phenyl phenol<br>Resorcinol<br>Xylenol<br>"Tar acids" (preferably refined by distillation)<br>Cyclohexyl phenol | O-chlor phenol.<br>Monochlor α-naphthol.<br><br><br><br>Chlor-resorcinols. |
| Alcohols | Benzyl alcohol<br>Phenyl ethyl alcohol | Chlor benzyl alcohols. |
| Aldehydes (less desirable because of polymerization). | Benzaldehyde | |
| Ketones | Acetophenone<br>Benzophenone<br>Alkylated benzophenones, e. g.:<br>  Methyl benzophenones<br>  Dimethyl benzophenones<br>  Ethylated benzophenones<br>  Propylated benzophenones<br>Phenyl tolyl ketones<br>Dinaphthyl ketone | Monochlor acetophenone.<br>Monochlor benzophenone.<br>Alkylated chlor-benzophenones, e. g.:<br>  Methyl chlor-benzophenones.<br>  Dimethyl chlor-benzophenones.<br>  Ethylated chlor-phenones.<br>  Propylated chlor-benzophenones. |
| Amides | Acetanilide<br>Stearanilide | Stear-chloranilides. |
| Acids | Aromatic fatty acids, e. g.:<br>  Phenyl acetic acid<br>  Phenyl stearic acid<br>  Salicylic acid | Chlorphenyl acetic acids.<br>Chlorphenyl stearic acids.<br>Chlor-salicylic acids. |
| Esters and salts | Phenyl acetate<br>Phenyl carbonate<br>Ethyl benzoate<br>Butyl benzoate<br>Di-methyl phthalate<br>Di-ethyl phthalate<br>Dibutyl phthalate<br>Methyl salicylate<br>Benzyl acetate<br>Pyridine acetate<br>Quinoline acetate<br>Quinoline oleate<br>Quinoline stearate<br>Pyridine stearate<br>Esters and salts of aromatic fatty acids, e. g.:<br>  Esters of phenyl-acetic and phenyl stearic acids, including the methyl, ethyl, butyl, lauryl, cetyl and ceryl esters; sodium and calcium phenyl-stearate. | Ethyl chlorbenzoates.<br>Butyl chlorbenzoates.<br>Di-methyl chlorphthalates.<br>Di-ethyl chlorphthalates.<br>Dibutyl chlorphthalates.<br><br>Methyl chlor salicylates.<br>Chlorbenzyl acetates.<br><br><br><br><br><br>Esters of chlor-aromatic fatty acids, e. g.:<br>  Esters of chlorphenyl acetic and chlorphenyl stearic acids including the methyl, ethyl, butyl, lauryl, cetyl and ceryl esters; sodium and calcium chlor-phenyl-stearates. |
| Ethers | Diphenyl ether<br>Phenyl ethyl ether<br>Dixenyl ether<br>Dinaphthyl ether<br>Alkylated diphenyl ether | Chlorinated diphenyl ether.<br>Chlorphenyl ethyl ethers.<br>Chlorinated dixenyl ether.<br>Chlorinated dinaphthyl ether.<br>Alkylated chlor-diphenyl ether. |

Non-aromatic oxygen-bearing organic ring compounds
  Cyclo-hexanol
  Cyclo-hexyl esters, e. g. cyclo-hexyl stearate, cyclo-hexyl laurate, tri-cyclo-hexyl phosphate, tri-cyclo-hexyl phosphite
  Naphthenic acids
  Esters of naphthenic acids, e. g. methyl naphthenates Oxygen-bearing heterocyclic compounds
(1) Furane and derivatives, e. g.
  Esters of pyromucic acid (furoates), e. g. methyl furoate, butyl furoate
  Furfuryl alcohol and esters of it, e. g. furfuryl acetate, furfuryl stearate
  Tetrahydrofurfuryl alcohol and esters of it, e. g. tetrahydrofurfuryl acetate and stearate
(2) Oxygen-bearing derivatives of thiophene and pyrrole, e. g. esters of thiophene carboxylic acids and esters of pyrrole carboxylic acids.

| Chain compounds | Unhalogenated | Halogenated |
|---|---|---|
| Alcohols | Octyl alcohol<br>Decyl alcohol<br>Lauryl alcohol<br>Cetyl alcohol<br>Carnaubyl alcohol<br>Ceryl alcohol<br>Montanyl alcohol<br>Melissyl alcohol<br>Myricyl alcohol | Fluorinated octyl alcohol.<br>Fluorinated decyl alcohol.<br>Fluorinated lauryl alcohol<br>Fluorinated cetyl alcohol.<br>Fluorinated carnaubyl alcohol.<br>Fluorinated ceryl alcohol.<br>Fluorinated montanyl alcohol.<br>Fluorinated melissyl alcohol.<br>Fluorinated myricyl alcohol. |
| Esters and salts | Methyl palmitate<br>Methyl stearate<br>Methyl lactate<br>Butyl lactate<br>Lauryl acetate<br>Cetyl acetate<br>Ceryl acetate<br>Tri-ethanol-amine acetate<br>Tri-lauryl phosphate<br>Tri-lauryl phosphite<br>Di-ethyl oxalate | Methyl dichlor palmitate.<br>Methyl dichlor stearate.<br>Sodium chlorhydroxy-stearate. |

| Chain compounds | Unhalogenated | Halogenated |
|---|---|---|
| Esters and salts | Di-utyl oxalate<br>Di-lauryl oxalate<br>Di-cetyl oxalate<br>Di-ceryl oxalate<br>Dimethyl malonate<br>Dibutyl malonate<br>Dimethyl succinate<br>Dibutyl succinate<br>Dimethyl tartrate<br>Dibutyl tartrate<br>Dilauryl tartrate<br>Tributyl citrate<br>trilauryl citrate | Sodium chlorhydroxy-stearate. |
| Hydroxy-amines | Tri-ethanol amine<br>Tri-butanol amine<br>Dibutyl ethanolamine | |
| Ethers | Butyl ether<br>Amyl ether<br>Octyl ether<br>Laruyl ether | Chlorinated or fluorinated:<br>Ethyl ether (notably β, β' dichlor ethyl ether).<br>Butyl ether.<br>Amyl ether. |
| Ketones | Dipropyl ketone<br>Dibutyl ketone<br>Di-amyl ketone<br>Di-octyl ketone<br>Laurone<br>Palmitone<br>Stearone | Chlorinated or fluorinated:<br>Laurone.<br>Palmitone.<br>Stearone. |
| Acids | Propionic acid<br>Butyric acid<br>Lauric acid<br>Palmitic acid<br>Stearic acid<br>Hydroxystearic acid | Chlorinated or fluorinated:<br>Lauric acid.<br>Palmitic acid.<br>Stearic acid.<br>Chlorhydroxystearic acid. |

A good example of a solvent of the oxygen-bearing class is chlorinated diphenyl ether, containing an average of from about three to about eight atoms of halogen per molecule. Chlorinated diphenyl ether which contains about six atoms of chlorine per molecule, and has preferably been purified by vacuum distillation, or other means, is one of the most desirable solvents of this class. This solvent boils at a temperature about 300° C. without appreciable decomposition. (See my co-pending application Ser. No. 83,976.)

Of the above enumerated classes of oxygen-bearing compounds, the aromatic compounds are generally preferred and particularly the aromatic ethers and ketones. Another preferred class of compounds is that in which oxygen forms a part of a ring structure. In the case of unhalogenated oxygen-bearing organic compounds, particularly for use in crank-case lubricants, they should preferably boil at atmospheric pressure without appreciable decomposition.

Since aromatic compounds containing multiple ring structures of the condensed type such as naphthalene, anthracene, phenanthrene, etc. (that is, of the type in which certain carbon atoms are contained in or common to two rings) are more easily oxidized, and, therefore, less stable than the "non-condensed" multiple-ring type in which no carbon atoms are thus shared, the latter type is to be preferred. Poly-nuclear aromatic compounds (that is, those containing more than one ring) of the non-condensed type are thus the more desirable of such aromatic compounds.

It is to be noted that certain compounds of the class in which oxygen is in the form of an inorganic radical, have the additional advantage of inhibiting corrosion, and, therefore, otherwise corrosive halogenated oxygen-free organic compounds may be used in conjunction with them for service in lubricants. Notable examples of such compounds are the organic phosphates, of which tri-phenyl phosphate and tri-cresyl phosphate are good examples, and the phosphites, such as tricyclohexyl phosphite, tri-phenyl phosphite and the alkylated aromatic phosphites. Other examples of such compounds will be found in my co-pending applications Ser. Nos. 99,165 filed September 2, 1936, and 119,132 filed January 5, 1937. However, with these exceptions, the oxygen is generally preferred in the form of an organic radicle.

Of the specific compounds mentioned in this application, all are more or less effective, when incorporated in a hydrocarbon oil, to improve the properties of the oil affecting its use as a lubricant, altho in order to increase the sludge-solventicity to a maximum degree, it is preferable to employ combinations of them in accordance with my present invention. However, many of the individual examples of compounds listed herein may be used alone as the sole addition to the hydrocarbon oil to effect considerable improvement in sludge-solventicity, as well as other properties of the oil affecting its use as a lubricant. All of the halogen compounds, for example, are effective extreme pressure addition agents and the oxygen compounds are more or less effective to improve "oiliness."

Preferred combinations to make up my new solvent include:

About 25% to 75% o-dichlor benzene, ethyl chlor-benzenes, ethyl dichlor benzenes, or diethyl tetrachlor benzenes, with one or more of the following:

Hexachlor diphenyl oxide
    Trichlor diphenyl oxide
    Monochlor benzophenone
    Benzophenone
    Methyl benzophenones
    Methyl chlorbenzophenones
    Phenyl acetate
    Phenol
    o-Phenyl phenol
    Cyclo hexanol
    Dibutyl phthalate
    Methyl salicylate
    Lauryl alcohol
    Methyl stearate
    Tri-ethanol amine
    Tri-ethanol amine acetate The chlorinated diphenyl oxide and other compounds referred to above are compounds containing an average number of chlorine atoms equivalent to that indicated.

In cases where the lubricant is to be exposed to relatively high temperatures, it is of particular advantage to use compounds for both components of my new solvent which are highly stable. For use in the crankcases of internal combustion engines, it will usually be preferable to employ compounds which will not be subject to thermal decomposition when the lubricant is exposed to temperatures as high as 140° C., and more desirably 170° C. or even 200° C. It is frequently advisable to employ compounds which will boil at atmospheric pressure without appreciable decomposition, preferably at temperatures above 140° C., or more desirably 170° C. or even 200° C.

Chlorine, bromine, and fluorine are the halogens most desirable in both the oxygen-free and oxygen-containing compounds, fluorine forming particularly stable compounds which are no longer so difficult to prepare as formerly. Methods of preparing fluorine compounds which will be found satisfactory for use in my solvent are described, for instance, in U. S. Patent No. 2,013,030, Example IV, and in U. S. Patent No. 2,013,050, Example X. My invention, of course, is not to be considered as involving any particular method of preparation of the components nor is it intended to be limited by any such method or methods. Chlorine is the least expensive and most commercially available of all the halogens, and bromine is also satisfactory, although considerably more expensive, as is iodine.

The action of my new solvent composition may sometimes be improved by the use of a more or less complex mixture in the case of one or both of the two components used. This complexity may result from (1) the production of a plurality of compounds obtained by the halogenation process, as, for example, the chlorination of diphenyl or of diphenyl ether, either of which is capable of producing a large number of chlorine-bearing compounds differing as to the number and location of the chlorine atoms in the molecule; or (2) the use of a product which, before halogenation, is a complex organic material, such as: (a) chlorinated petroleum fractions; chlorinated paraffin wax; chlorinated commercial aromatic hydrocarbon products, such as mixed toluenes and xylenes, "dead oil", and the like; for the halogenated oxygen-free component; and (b) non-drying fatty oils, such as sperm oil; tar acids; and esters derived from mixed alcohols, such as "lorol;" for the oxygen-bearing component.

It is also of advantage to use a combination of solvent components which will have a fairly wide range of volatility. This assures a certain and uniform solvent action, even if some of the components should be partially volatilized by unexpectedly high temperatures.

The oil base

The lubricating oil which constitutes the oil base of my improved lubricant as noted above may be any mineral lubricating oil or synthetic equivalents. For use in the crankcases of internal combustion engines, the oil base will preferably be a highly refined mineral oil or synthetic hydro-carbon oil, and usually within the viscosity range of from about 30 to about 160 seconds Saybolt at 210° F., and more often within the range of 40 to 80.

Drastically refined oils, including those which have been solvent-extracted, the properties of which have been greatly improved for certain uses, are now available. The particular properties which it has been found possible to improve by such methods are, among others, the viscosity index and the "sludge" forming tendency of the oil. However, oils of this type, when subjected to heat and oxidation, are still subject to the tendency to precipitate a resinous or varnish-like coating on the metal parts with which the oil comes in contact. This tendency is particularly serious in the crankcase lubrication of heavily loaded or high-speed internal combustion engines, notably of the aviation and Diesel types where the lubricant is exposed to relatively high temperatures.

For gear lubrication, the mineral oil need not be so highly refined and even so-called black oils are sometimes used. However, it is usually preferable to use a reasonably well-refined oil such as steam-refined or bright stock, or blends of steam-refined and/or bright stock with neutral oils. The viscosity range for the purpose of gear lubrication will ordinarily be from about 40 to about 250 seconds Saybolt at 210° F., and more often within the range of from 50 to 150.

In the case of mineral oils, suitable oils may be derived from any of the various types of crudes, for example:

Pennsylvania (paraffinic)
Mid-Continent (mixed) or
Coastal (naphthenic)

The paraffinic oils were, until recently, generally preferred for many uses because of their higher viscosity index, but improved refining methods, particularly various modifications of the solvent-extraction type of refining process, have made it possible to produce oils of almost any desired viscosity index from any of the other crudes. For example, solvent-extracted oils from Coastal crudes with viscosity indices (Dean and Davis) from about 50 to about 90, and from Mid-Continent crudes with viscosity indices of from about 90 to about 110 are now commercially available. The same type of process, applied to oils obtained from Pennsylvania crudes, has produced oils with a viscosity index ranging from about 100 to about 120, or even higher.

As noted above, these oils may also have the "sludge" forming tendency greatly reduced but are still susceptible to the formation of varnish-like deposits. For this reason, the Mid-Continent or naphthenic oils, refined by the more conventional methods, are still to a considerable extent, preferred for use where the resinous type of deposit is particularly undesirable as in the lubrication of Diesel engines, particularly those operated under high loads or at high temperatures. For certain uses of this type, it is considered more desirable to use an oil which may, to a certain extent, be "sludge" forming but will not have the disadvantage of sticking rings or pistons because of its tendency to form resinous deposits. Mineral oil of this type is now widely used for this purpose, and more recently in conjunction with detergent materials, such as oil-soluble soaps, which have been added in small amounts to further overcome the ring-sticking tendency of the oil.

The solvent combination of my invention is useful in improving oils of the highly refined type, such as those generally used in crankcase lubrication, and likewise to improve the less highly refined oils usually used in gear lubrication. It is useful both in overcoming the tendency of the refined Pennsylvania and solvent-extracted types of oils to form varnish-like deposits, and to overcome the tendency of the naphthenic type oils to form "sludge." It may also be used to advantage in conjunction with detergents such as those described above. It should be noted that one or both of the components of my solvent may be of the type which also has detergent properties.

It is to be understood that among the oils which may be used as the base of my improved compositions are included hydrogenated as well as voltolized oils.

As the exact manner in which my solvent constituents act upon the "sludge" is not entirely understood, I do not intend my invention to be restricted by any explanation or theory. However, it seems that the two types of solvents mutually aid one another in attacking the gummy "sludge" for it has been found that the effectiveness of their joint action is more than the cumulative effect of the two when used separately.

The presence of the halogen lowers the volatility and thus enables the use of a number of the most effective solvents which would otherwise be too highly volatile at engine temperatures. The presence of the halogen also notably enhances the solvent action of the compounds and therefore makes available more effective compounds. The degree of halogenation may, however, reach an optimum beyond which further halogenation gives no improvement in the solvent action or may even cause a decline in effectiveness.

The relative proportions of halogenated oxygen-free organic constituents and oxygen-bearing organic constituents in the new solvent comprising my invention may vary within wide limits, depending upon the particular materials used (a very minor proportion of the more active components at times being quite effective), the kind of oil to which the solvent is to be added, and the kind of engine employing the lubricant. The ratio of the amount of halogenated oxygen-free organic constituents to the amount of oxygen-bearing organic material usually may vary from about one to ten, up to about ten to one, but preferably only from about one to two, up to two to one. For most applications a lubricating composition containing a solvent comprising substantially equal amounts of each type has been found very satisfactory.

The amount of the solvent combination to be added to the oil will depend upon the type of oil and the type of engine using the lubricant, and may vary over wide limits, for example, from about .001% to about 20% by weight based on the oil. To obtain a maximum of desirable characteristics in the lubricant, a proportion of from about .1% to about 3% of the combined solvent is usually of advantage while amounts up to 5 or 10% are occasionally desirable and amounts up to 20% may often be used without unduly decreasing the viscosity of the lubricant.

Proper stability of the components of the solvent combination in the lubricant is an important factor. Since the materials are to be exposed to relatively high temperatures in the crankcase, etc., they should be particularly resistant to thermal decomposition.

Resistance to hydrolysis is a most desirable characteristic because of the likelihood of a certain amount of moisture being present in the crankcase. Under these conditions, easily hydrolyzed halogen compounds will tend to produce hydrogen halides which will cause corrosion of the parts of the engines with which they come in contact. Although this tendency may be corrected to a certain extent by the use of proper inhibitors.

Elsewhere in this specification reference is made to the fact that the specifically identified addition agents contemplated for use may be incorporated in the lubricating composition of my invention in amounts up to 20% or for certain uses, in lesser amounts, for example, up to 10% or up to 5%.

Among the large number of classes of compounds disclosed herein will be found specific examples which are not fully oil-soluble to the extent of the percentages above stated. Certain of such compounds will be soluble to only a minor extent, for example, on the order of about 1%, and they, of course, are useful for the purpose herein specified up to the extent of their solubility. Still others are difficultly soluble to any extent, even minor, and require the use of special blending apparatus or even mutual solvents in order to embody the same in a composition in such form as not to separate out. Among the large class of compounds identified will also be found certain specific examples which may not be soluble in mineral oil to any extent. Those will obviously not be useful for my purpose.

Throughout the specification and the claims, therefore, I have employed the term "oil-soluble" as being a further limitation on the compounds which are useful in the compositions of my invention. Where the compound is soluble to only a limited extent, i. e., less than the range specified within which the same may be employed, it will be understood, of course, that the use of such compound is covered only up to the extent of its solubility.

The term "soluble" as used herein, is intended to indicate the ability to form not only true solutions but also any form of substantially permanently stable, homogeneous compositions when incorporated in the lubricating composition.

The superiority of my lubricant has been demonstrated commercially by its highly successful use in automobile, truck and bus engines. The solvent constituents may be most conveniently introduced into the mineral oil before such oil is placed in the crankcase, but this invention does not cover nor is it intended to be limited by any particular method of addition of the solvent constituents to the lubricant. Any practicable means of addition is intended to be within the scope of this invention. Other specific applications of this invention have been made and will occur to those acquainted with the art and this invention is intended to include all such applications.

To a mineral oil base are, therefore, added my solvent constituents comprising at least one representative of each of the two types of compounds disclosed to inhibit the formation and aid in removal of oil "sludge." It is generally preferable, but not absolutely necessary, that at least one of the solvents be of the aromatic series. The two solvent compositions described have a cooperative dissolving effect, each enabling the other to work more quickly and completely.

This invention is equally applicable to other than automotive fields of lubrication and other uses for my improved lubricant will be immediately apparent to those skilled in the art. This invention is intended to cover all such applications.

It is also to be noted that combinations of the type described are highly effective in increasing the extreme pressure characteristics of the lubricant, and thus my improved lubricant has the combined advantages of being sludge-resistant even in cold weather, and at the same time providing the safety of an extreme pressure lubricant.

The following are specific examples of lubricating compounds, in accordance with my invention, particularly useful as crankcase lubricants in internal combustion engines. These same compositions may advantageously be used also as spindle oils, hydraulic oils, compressor oils and the like, particularly under conditions which expose the lubricant to oxidation at high temperatures.

The base oil will preferably be a Pennsylvania motor oil (or other oil of high viscosity index) having a viscosity such that it will meet the specifications for an S. A. E. 10, 20, 30, 40, 50 or 60 motor oil. For crankcase lubrication, in most cases, I prefer the lower viscosity range as a base for my compositions, namely the S. A. E. 10, 20 and 30 oils. Other types of oils may be used instead of Pennsylvania oil in preparing these compositions, for example, Mid-Continent or naphthenic base oils.

In the following examples of lubricating compositions, I shall indicate only those addition agents, the use of which is the particular subject-matter of the present invention. It will be understood that in each specific example, the remainder of the composition is substantially all mineral lubricating oil of the character above defined with the possible addition of minor amounts of further constituents such as means for improving the cold test, etc., as are commonly employed in lubricating compositions of this character.

*Example 1*

0.5% orthodichlor benzene
0.5% hexachlor diphenyl oxide

*Example 2*

0.5% orthodichlor benzene
0.5% hexachlor diphenyl oxide
0.25% methyl stearate, and
0.25% butyl stearate

*Example 3*

0.5% orthodichlor benzene
0.5% hexachlor diphenyl oxide
0.25% methyl dichlorstearate

*Example 4*

0.5% orthodichlor benzene
0.5% hexachlor diphenyl oxide
0.12% methyl chlorsalicylate
0.1% methyl salicylate

*Example 5*

0.5% orthodichlor benzene
0.5% hexachlor diphenyl oxide
1.0% calcium phenyl-stearate

*Example 6*

0.5% orthodichlor benzene
0.5% hexachlor diphenyl oxide
1.0% calcium chlorphenyl-stearate

*Example 7*

0.5% orthodichlor benzene
0.5% hexachlor diphenyl oxide
0.5% cyclo-hexyl stearate

*Example 8*

0.5% orthodichlor benzene
0.5% hexachlor diphenyl oxide
0.5% methyl phenyl-stearate

*Example 9*

0.5% orthodichlor benzene
0.5% hexachlor diphenyl oxide
0.5% methyl chlorphenyl-stearate

*Example 10*

0.5% orthodichlor benzene
0.5% hexachlor diphenyl oxide
0.25% benzophenone

*Example 11*

0.5% orthodichlor benzene
0.5% hexachlor diphenyl oxide
0.25% methyl benzophenone

*Example 12*

0.5% orthodichlor benzene
0.5% hexachlor diphenyl oxide
0.5% di-ethyl diphenyloxide

*Example 13*

0.5% orthodichlor benzene
0.5% hexachlor diphenyl oxide
0.5% dimethyl phthalate

*Example 14*

0.5% orthodichlor benzene
0.5% hexachlor diphenyl oxide
0.5% dibutyl phthalate

*Example 15*

0.5% orthodichlor benzene
0.5% hexachlor diphenyl oxide
0.13% methyl salicylate

*Example 16*

0.5% orthodichlor benzene
0.5% hexachlor diphenyl oxide
0.13% methyl chlorobenzophenone

*Example 17*

0.5% orthodichlor benzene
0.5% hexachlor diphenyl oxide
0.13% cyclohexyl salicylate

*Example 18*

0.5% orthodichlor benzene
0.5% hexachlor diphenyl oxide
0.13% cyclohexyl chlorsalicylate

*Example 19*

0.5% orthodichlor benzene
0.5% hexachlor diphenyl oxide
0.1% tri-cyclohexyl phosphite

*Example 20*

0.5% orthodichlor benzene
0.5% hexachlor diphenyl oxide
0.2% tri-cyclohexyl phosphate

*Example 21*

0.5% orthodichlor benzene
0.5% hexachlor diphenyl oxide
0.25% butyl acetyl ricinoleate

*Example 22*

0.5% orthodichlor benzene
0.5% hexachlor diphenyl oxide
0.06% di-ethylene glycol dichlorstearate (mono-ester)

Example 23

0.5% orthodichlor benzene
0.5% hexachlor diphenyl oxide
0.5% cyclohexyl phenyl-stearate

Example 24

0.5% orthodichlor benzene
0.5% hexachlor diphenyl oxide
0.5% cyclohexyl chlor-phenyl stearate

Example 25

0.5% orthodichlor benzene
0.5% hexachlor diphenyl oxide
0.25% methyl chlorbenzoate

Example 26

1.0% o-dichlor benzene
0.5% butyl stearate

Example 27

0.4% o-dichlor benzene
0.13% triphenyl phosphite
0.4% hexachlor diphenyl oxide

Example 28

0.3% o-dichlor benzene
0.06% tricyclohexyl phosphite
0.3% hexachlor diphenyl oxide

Example 29

0.25% o-dichlor benzene
0.3% tri-cresyl phosphate
0.25% hexachlor diphenyl oxide

Example 30

0.15% o-dichlor benzene
0.03% di-lorol phosphate
0.16% tri-phenyl phosphite
0.15% hexachlor diphenyl oxide

Example 31

1.0% o-dichlor benzene
0.5% methyl stearate
0.5% hexachlor diphenyl oxide

Example 32

0.25% o-dichlor benzene
0.25% methyl dichlor benzophenone

Example 33

0.4% o-dichlor benzene
0.02% methyl salicylate
0.4% hexachlor diphenyl oxide
0.2% methyl chlor-salicylate

Example 34

0.25% o-dichlor benzene
0.25% di-ethyl tetrachlor benzene
0.25% methyl stearate
0.25% butyl stearate
0.5% hexachlor diphenyl oxide

Example 35

0.5% di-ethyl tetrachlor benzene
0.5% hexachlor diphenyl oxide
0.25% methyl dichlorstearate

Example 36

0.5% di-ethyl tetrachlor benzene
0.5% hexachlor diphenyl oxide
0.25% cyclohexyl dichlorstearate

Example 37

0.5% di-ethyl tetrachlor benzene
0.25% methyl chlor-salicylate

Example 38

0.5% di-ethyl tetrachlor benzene
0.25% cyclohexyl chlor-salicylate

Example 39

0.5% di-ethyl tetrachlor benzene
0.5% hexachlor diphenyl oxide
1.0% calcium chlor-phenyl-stearate

Example 40

0.5% di-ethyl tetrachlor benzene
0.5% hexachlor diphenyl oxide
0.5% cyclohexyl chlor-phenyl-stearate

Example 41

0.5% di-ethyl tetrachlor benzene
1.0% calcium phenyl-stearate
0.5% hexachlor diphenyl oxide

Example 42

0.25% o-dichlor benzene
0.25% di-ethyl tetrachlor benzene
0.5% hexachlor diphenyl oxide
0.25% methyl dichlorstearate

Example 43

1.0% o-dichlor benzene
0.5% chlorinated diphenyl (48% Cl)
0.5% methyl stearate

Example 44

1.0% chlorinated diphenyl (48% Cl)
0.5% hexachlor diphenyl oxide

Example 45

1.0% chlorinated diphenyl (48% Cl)
0.5% hexachlor diphenyl oxide
0.25% cyclohexyl chlor-salicylate

Example 46

1.0% chlorinated diphenyl (48% Cl)
0.5% hexachlor diphenyl oxide
0.5% calcium chlor-phenyl-stearate

Example 47

0.5% o-dichlor benzene
0.5% ethylated chlorinated naphthalene
0.5% methyl stearate

Example 48

0.5% o-dichlor benzene
0.5% ethylated chlorinated naphthalene
0.5% hexachlor diphenyl oxide

Example 49

1.0% ethylated chlorinated naphthalene
0.5% hexachlor diphenyl oxide
0.25% methyl dichlorstearate

Example 50

0.25% o-dichlor benzene
0.25% di-ethyl tetrachlor benzene
0.25% methyl dichlorstearate

Example 51

0.5% di-ethyl tetrachlor benzene
0.5% methyl dichlorstearate (Note.—"Hexachlor diphenyl oxide," referred to in the above examples, consists of the vacuum distilled fraction of chlorinated diphenyl oxide which has an average of six chlorine atoms per molecule.)

Specific examples of lubricating compounds according to my invention, which are suitable for use in gear lubrication and the like, are as follows:

The base oil in this case will be a gear oil having a viscosity such that it will meet with the specifications for S. A. E. number 80, 90, 110, 160 or 250 gear oil and may be prepared by blending two or more stocks consisting of bright stocks, steam-refined stocks or neutral oils, to give the desired characteristics. In most cases, I prefer for my purpose a base oil which has a relatively high viscosity index such as may be obtained by using Pennsylvania oils.

Similarly as in connection with the examples of lubricating compositions which have been found useful as crankcase lubricants, I shall indicate in the following examples of gear lubricants only those addition agents about which the present invention is primarily concerned. It is to be understood, of course, that the gear lubricants given below may contain, in addition to the mineral oil specified above to make up the entire composition, minor amounts of other constituents such as are commonly employed in gear lubricants, for example, thickening agents, such as soaps, etc.

Example 52

| | Per cent |
|---|---|
| Chlorinated paraffin wax (containing about 40% chlorine) | 8 |
| Butyl stearate | 1 |

Example 53

| | |
|---|---|
| Chlorinated paraffin wax | 6 |
| Tricresyl phosphate | 1 |

Example 54

| | |
|---|---|
| Chlorinated retene oil | 4 |
| Dilorol phosphate | 0.1 |
| Tri-cresyl phosphate | 1 |

Example 55

| | |
|---|---|
| Chlorinated paraffin wax | 8 |
| Di(chlorbenzyl) disulphide | 2 |
| Tricresyl phosphate | 1 |

Example 56

| | |
|---|---|
| Chlorinated paraffin wax | 7.5 |
| Chlorbenzyl thiocyanate | 1.5 |
| Tricresyl phosphate | 1 |

Example 57

| | |
|---|---|
| Chlorinated paraffin wax | 8 |
| Tricresyl thiophosphate, $(C_7H_7O)_3PS$ | 1 |

The lubricating compositions of the present invention will be found admirably suited as addition agents for internal combustion engine fuels. When the fuel to which these compounded lubricants are added is a liquid hydrocarbon boiling within the gasoline range the lubricating composition will preferably contain a total of from about 2% to about 10% and even up to about 15% of the addition agents, i. e. the halogen-bearing oxygen-free organic compound and the organic oxygen compound which characterize the lubricating compositions referred to above. Such compounded lubricant is then added to the lighter hydrocarbon fuel in quantities varying from about 0.05% to about 1.50% by volume. The optimum amount of lubricant added to the fuel will be found to be in the vicinity of about 0.30%, i. e. in the range from about 0.15% to about 0.60%.

Other modes of applying the principle of my invention may be employed instead of the one explained, change being made as regards the materials employed, provided the ingredients stated by any of the following claims or the equivalent of such stated ingredients be employed.

I, therefore, particularly point out and distinctly claim as my invention:

1. A lubricating composition comprising at least 80% refined mineral lubricating oil with the properties of such composition affecting its use as a lubricant improved by incorporating therein a total of from about .1% to about 20%, based on the amount of mineral lubricating oil of both an oil-soluble halogen-bearing oxygen-free organic compound and an oil-soluble organic oxygen compound, said compounds being of the type which will not substantially evaporate from such lubricating composition at ordinary temperatures.

2. A composition in accordance with claim 1 in which the oxygen-bearing compound is a halogenated compound.

3. A composition in accordance with claim 1 in which the oxygen-bearing compound is a chlorinated compound.

4. A composition in accordance with claim 1 in which the oxygen-bearing compound is an ether.

5. A composition in accordance with claim 1 in which the oxygen-bearing compound is an acid.

6. A composition in accordance with claim 1 in which the oxygen-bearing compound is an ester.

7. The method of reducing the tendency of a lubricating composition which consists essentially of refined mineral lubricating oil to deteriorate as by way of producing sludge or gummy or varnish-like deposits which comprises blending therewith an effective amount less than about 20%, based on the amount of such mineral lubricating oil of both an oil-soluble halogen-bearing oxygen-free organic compound and an oil-soluble organic oxygen compound, said compounds being of the type which will not substantially evaporate from such lubricating composition at ordinary temperatures.

8. The method of reducing the tendency of a lubricating composition which consists essentially of refined mineral lubricating oil to deteriorate as by way of producing sludge or gummy or varnish-like deposits which comprises blending therewith a total of about .001% to about 20%, based on the amount of such mineral lubricating oil of both an oil-soluble halogen-bearing oxygen-free organic compound and an oil-soluble organic oxygen compound, said compounds being of the type which will not substantially evaporate from such lubricating composition at ordinary temperatures and being present in a ratio of from about 1 to 10 up to about 10 to 1.

9. In the art of making lubricating oils the method which comprises blending mineral lubricating oil with a total of from about 0.1% to about 20%, based on the amount of mineral lubricating oil of both an oil-soluble halogen-bearing oxygen-free organic compound and an oil-soluble organic oxygen compound, said compounds being of the type which will not substantially evaporate from such lubricating composition at ordinary temperatures.

10. In the art of making petroleum lubricating oils, the method which comprises adding to petroleum oil a substantial quantity, i. e. a total less than about 20%, of both an oil-soluble halogen-bearing oxygen-free organic compound and an oil-soluble organic oxygen compound, said compounds being of the type which will not substantially evaporate from such lubricating composition at ordinary temperatures and being present in amount sufficient to materially increase the extreme pressure characteristics of the lubricant and at the same time materially increase the resistance of the composition to sludging.

11. A composition in accordance with claim 1 in which the oxygen-bearing compound is a saturated organic compound.

12. A composition in accordance with claim 1 in which the oxygen-bearing compound is chlorinated stearic acid.

13. A composition in accordance with claim 1 in which the oxygen-bearing compound is methyl chlor salicylate.

14. A composition in accordance with claim 1 in which the oxygen-bearing compound is hexachlor diphenyl oxide.

15. A composition in accordance with claim 1 in which the oxygen-bearing compound is a derivative of an acid containing an inorganic substituent.

16. A composition in accordance with claim 1 in which the oxygen-bearing compound is an ester containing an inorganic substituent.

CARL F. PRUTTON.